UNITED STATES PATENT OFFICE.

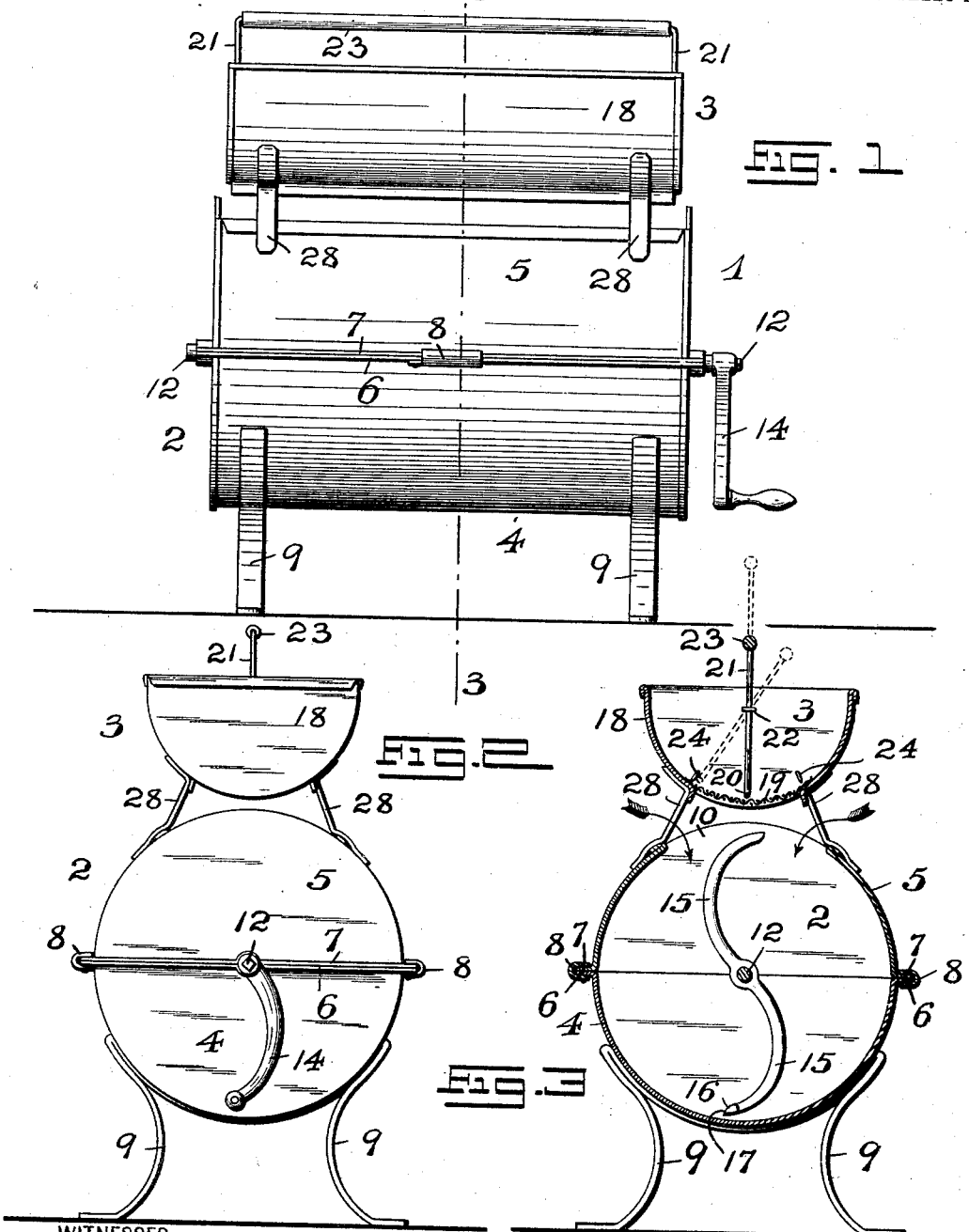

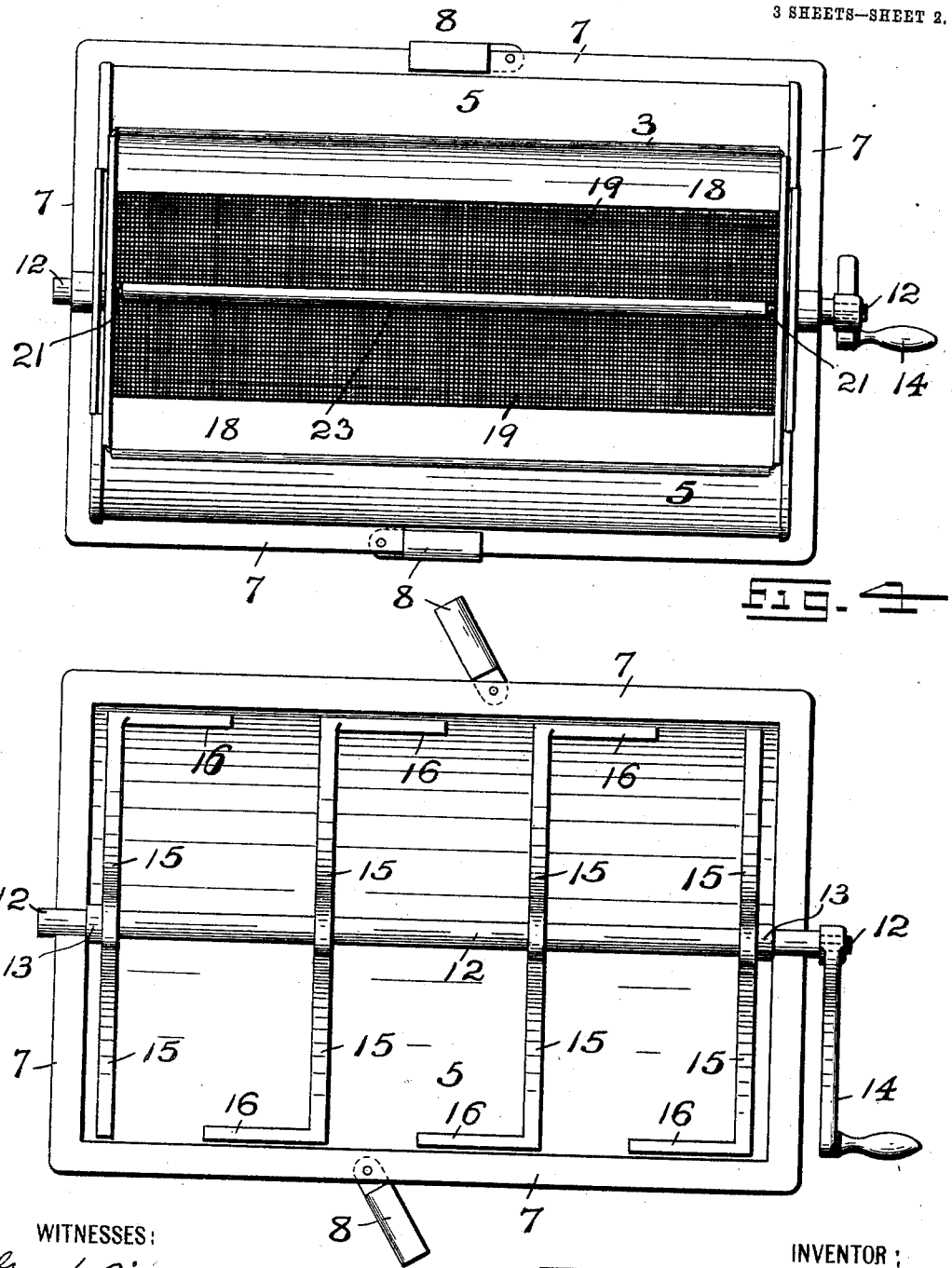

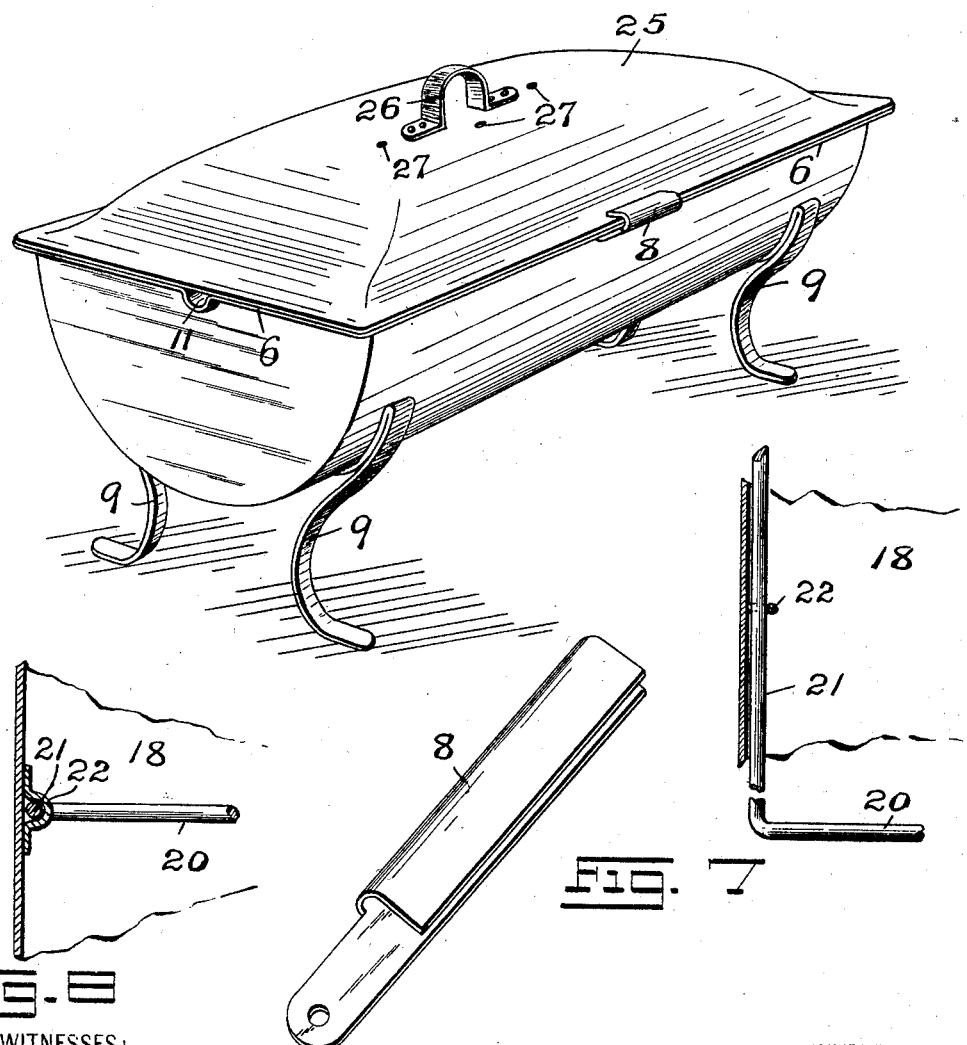

HARRY H. WILSON, OF NEWARK, NEW JERSEY.

APPARATUS FOR MIXING DOUGH.

SPECIFICATION forming part of Letters Patent No. 719,070, dated January 27, 1903.

Application filed October 23, 1902. Serial No. 128,385. (No model.)

*To all whom it may concern:*

Be it known that I, HARRY H. WILSON, a citizen of the United States, residing at Newark, in the county of Essex and State of New Jersey, have invented certain new and useful Improvements in Apparatus for Mixing Dough; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to a novel construction of apparatus for mixing dough, with a view of providing a simple and cheaply-constructed apparatus of the character hereinafter more particularly set forth in which the flour is sifted into the water, yeast, and other ingredients in sufficient quantities as required for mixing a proper bread, pie, biscuit, or other dough.

The invention has for its further object to provide a novel construction of dough-mixing compartment with a flour-sifting compartment in which the flour is contained directly above the said dough-mixing compartment, a suitable opening or openings being made in the shell or framework which surrounds the mixing-compartment of the apparatus, thereby allowing for a constant admission of air into the dough-mixing compartment during the process of mixing the dough, and whereby a greater amount of gluten is produced than when the air is excluded during the process of mixing in a closed or nearly closed compartment.

A further object of this invention is to provide a novel form of apparatus for mixing dough, the dough-mixing compartment being made in separable halves, one of which carries the flour holding or sifting compartment, which can be removed from the lower half of the mixing-compartment after the dough has been made and then replaced by a suitable cover, the device then being capable for use as a rising-pan when placed upon a range or other heater.

With these various objects of my invention in view the same consists in the novel construction of apparatus for mixing dough hereinafter set forth; and, furthermore, this invention consists in the various novel arrangements and combinations of parts, as well as in the details of the construction thereof, all of which will be fully described in the accompanying specification and then finally embodied in the clauses of the claim.

The invention is clearly illustrated in the accompanying drawings, in which—

Figure 1 is a front elevation of an apparatus embodying the principles of my present invention. Fig. 2 is an end view of the same, and Fig. 3 is a transverse vertical section taken on line 3 3 in said Fig. 1. Fig. 4 is a plan or top view of the apparatus, and Fig. 5 is a similar view of the lower half-section of the mixing-compartment of the apparatus and its removable agitator. Fig. 6 is a perspective view of the said lower half-section of the said mixing-compartment provided with a lid to enable this much of the apparatus to be used as a rising-pan. Fig. 7 is a detail vertical section of a portion of the flour containing or sifting compartment, representing in connection therewith a part of the agitator-bar therein and the bearing, connected with the side of said compartment, in which a portion of said bar is arranged to oscillate; and Fig. 8 is a detail horizontal section of the parts represented in said Fig. 7. Fig. 9 is a perspective view of one of the holding or locking catches employed with the mixing-compartment of the apparatus.

Referring now to the several figures of the drawings, the reference character 1 indicates the complete apparatus for the mixing of dough, the same comprising a lower mixing-compartment 2 and an upper flour containing or sifting compartment 3. The said mixing-compartment 2 consists, essentially, of a pair of separable semicylindrical shells or members 4 and 5, adapted to be fitted upon each other on their respective marginal flanges 6 and 7, as clearly indicated in Figs. 1, 2, and 3 of the drawings, suitably-constructed holding or locking devices, as 8, which are preferably pivotally attached to the flange 6 of the lower shell or member 4, being employed for suitably securing the upper shell or member 5 upon the said lower shell or member 4 during the process of mixing, as illustrated. The said lower shell or member 4 is also provided with suitable standards or supports 9, while the said upper shell or member 5 is made with an opening 10, for the purposes to be hereinafter more particularly specified.

The said shells or members 4 and 5 are provided in their ends with suitably-arranged semicircular openings 11, (see Fig. 6,) which form bearings for the reception of an agitator or mixer shaft 12. This shaft is made with shoulders 13 or other means to prevent any lateral movement of the shaft in said bearings, and suitably secured upon the end of said shaft 12 is a crank 14 for producing a rotary motion of said shaft. The said shaft 12 is also provided with any suitable number of arms 15, each arm being provided at its free end with a laterally-extending finger 16. These fingers, which move near the inner cylindrical surface of the mixing-compartment, are made with the comparatively sharp cutting edges 17 for suitably cutting and spreading the dough and while passing through the dough lifting the same in the manner of the fingers of a person mixing dough. These fingers 16, as will be seen from an inspection of Fig. 5, extend in opposite directions, so as to insure a more thorough mixing process of the dough during the rotary movements of the arms 15 past the opening 10 in the said upper shell or member 5.

The previously-mentioned flour containing or sifting compartment 3 consists, essentially, of a semicylindrical or other suitable trough-shaped shell or member 18, provided with a sieve or screen-covered lower portion 19, which is arranged slightly above the opening 10 of the mixing-compartment 2, so as to provide for a free passage of the air into the said mixing-compartment in the direction of the arrows clearly indicated in Fig. 3 of the drawings. In order that such proper passages may be provided between the said shell or member 18 and the upper shell or member 5 of the mixing-compartment, suitable supports 28 are employed, these supports being secured at their respective ends to the said shells or members 18 and 5, substantially as illustrated in the several figures of the drawings. Within the said sifting-compartment 3 I have arranged an oscillating agitator for stirring up the flour in said compartment 3, and thereby causing it to be forced through the screen or sieve into the mixing-compartment 2, while the agitator-arms in said latter compartment are being revolved by means of the crank 14 on the end of the shaft 12. This oscillating agitator in the compartment 3 consists, essentially, of a lower bar or rod 20, side rods or bars 21 at each end of said bar or rod 20, which are passed through and are loosely mounted in bearings 22, connected with the inner surfaces of the end pieces of said shell or member 18, and a cross bar or rod 23, connected with the upper end portions of the said side rods or bars 21, all of which is clearly illustrated in Figs. 3, 7, and 8 of the drawings. The said side rods or bars 21 extend directly above the upper edges of the said shell or member 18 and with the said lower bar or rod 20 may be made to oscillate in a backward and forward direction by means of the said cross rod or bar 23, suitable stops 24 being provided to limit the oscillatory movements of the cross rod or bar 20 the desired distance across the width of the screen or sieve.

The holding or locking catches 8 are preferably of the shape and construction illustrated in the drawings; but it will be evident that any other suitably-constructed devices for the same purposes may be employed, if desired. When the said catches 8 are turned into their unlatched positions, (indicated in Fig. 5,) then by raising the flour-agitator to the vertically-dotted position, (indicated in Fig. 3,) so as to bring the lower bar or rod 20 against the lower edges of the bearings 22, the connected shells or members 18 and 5 can be lifted from the lower shell or member 4 and carried about by means of the cross rod or bar 23, which thus serves as a handle for that purpose. When the dough has been properly mixed in the manner to be presently described and these shells or members 18 and 5, as well as the shaft 12 and its arms 15 and fingers 16, have been removed from their operative relation with the lower shell or member 4, a suitable cover or lid 25, which is provided with a handle, as 26, and suitably-disposed openings or perforations 27 for ventilation can be placed upon the said lower shell or member 4, latched in place by means of the devices 8, as clearly indicated in Fig. 6, and then placed upon a range or heater to allow the mixed dough to rise.

The manner of using the apparatus is briefly as follows: Prior to the placing of the shell 5 and dough agitator or mixer upon the lower shell or member 4 the liquid substance, in the form of water, yeast, and other ingredients, for producing a dough for bread, pies, cake, biscuits, rusks, and the like is placed in the said lower member 4. The dough agitator or mixer is then placed in position and the shell or member 5, with its connected shell or member 18, also arranged upon the lower shell or member 4 and latched in place by means of the devices 8. The proper quantity of flour is then placed in the shell or member 18. While revolving the arms 15 and their fingers 16, the flour in the upper shell or member 18 is simultaneously stirred through the sieve or screen by the oscillatory movements of the bar or rod 20 in the manner hereinabove stated, whereby the loose flour particles become thoroughly immersed in the dough liquid, and during the revolutions of the arms 15 and their fingers the constant addition of flour is thoroughly taken up by the dough, and thereby produces a light dough. After the dough has been properly mixed the shells or members 18 and 5 and the dough agitator or mixer shaft and parts are removed and replaced by the cover or lid 25 for rising purposes. While the arms 15 are being revolved, their horizontally-arranged fingers 16 will carry the pasty dough mass directly past the opening 10 and in close proximity to the air which is entering the mixing-chamber 2 in the direction of the arrows, as indicated in Fig. 3 of the drawings, thereby causing a complete and thorough commingling of the air with the dough during its mixing process and producing the gluten to a greater extent than is possible in a closed mixing-chamber.

The arrangements and constructions of the various parts of the apparatus are so simple that they can be easily manipulated, can be quickly separated, and are readily kept clean.

I am aware that changes may be made in the various arrangements and combinations of the parts without departing from the scope of my present invention. Hence I do not limit my invention to the exact arrangements and combinations of the parts as described in the previous specification and as illustrated in the accompanying drawings, nor do I confine myself to the exact details of the construction of the said parts.

Having thus described my invention, what I claim is—

1. A dough-mixing apparatus, comprising a lower mixing-compartment having an opening, a shaft mounted in said mixing-compartment, radially-disposed arms on said shaft, and laterally-extending fingers on some of said arms, a holding-compartment provided with a sieve located above the said opening in the mixing-compartment, and means connected with said flour-holding compartment and the mixing-compartment whereby said flour-holding compartment is arranged some distance above the mixing-compartment to provide an unobstructed air-passage for the air into the mixing-compartment, bearings in said flour-holding compartment, and an agitator adapted to oscillate in said bearings, consisting, essentially, of a lower cross-rod, a pair of upwardly-extending rods connected with said cross-rod and passing through said bearings, and a connecting-rod forming a handle between the upper portions of said upwardly-extending rods, substantially as and for the purposes set forth.

2. In an apparatus for mixing dough, the combination, of a mixing-compartment divided into detachably-connected upper and lower members, the upper member being provided with an opening, the said members being provided with semicircular openings, forming bearings, a shaft removably arranged in said bearings, radially-disposed arms on said shaft, and laterally-extending fingers on some of said arms, and a sieve-provided flour-holding compartment supported above and connected with the said upper member of the mixing-compartment to provide an unobstructed air-passage for the air into the said mixing-compartment, bearings in said flour-holding compartment, and an agitator adapted to oscillate in said bearings, consisting, essentially, of a lower cross-rod, a pair of upwardly-extending rods connected with said cross-rods, and passing through said bearings, and a connecting-rod forming a handle between the upper portions of said upwardly-extending rods, substantially as and for the purposes set forth.

3. In an apparatus for mixing dough, the combination, of a mixing-compartment divided into detachably-connected upper and lower members, the upper member being provided with an opening, marginal flanges on said members adapted to be placed upon each other, holding-latches adapted to be brought in holding engagement with said flanges to cause the locked engagement of the upper and lower members of the said mixing-compartment, and a sieve-provided flour-holding compartment supported above and connected with said upper member of the mixing-compartment to provide an unobstructed air-passage for the air into the said mixing-compartment, substantially as and for the purposes set forth.

4. In a machine for mixing dough, the combination, with a mixing-chamber, a shaft therein, and radially-extending arms on said shaft, provided with fingers at their free ends extending laterally and in opposite directions, of a sieve-provided flour-holding compartment provided with bearings, and an agitator adapted to oscillate in said bearings, consisting, essentially, of a lower cross-rod, a pair of upwardly-extending rods connected with said cross-rod and passing through said bearings, and a connecting-rod forming a handle between the upper portions of said upwardly-extending rods, substantially as and for the purposes set forth.

In testimony that I claim the invention set forth above I have hereunto set my hand this 21st day of October, 1902.

HARRY H. WILSON.

Witnesses:
FREDK. C. FRAENTZEL,
GEO. D. RICHARDS.